(No Model.)  3 Sheets—Sheet 1.

W. H. CHAPMAN.
ELECTRIC MOTOR.

No. 309,522.  Patented Dec. 23, 1884.

Witnesses.
Edw H Forder
Jas Moore

Inventor
Wm H Chapman
by McDaniel Wheeler Souther
Attorneys

N. PETERS, Photo-Lithographer, Washington, D.C.

(No Model.) 3 Sheets—Sheet 2.

W. H. CHAPMAN.
ELECTRIC MOTOR.

No. 309,522. Patented Dec. 23, 1884.

Witnesses
Edw. H. H. Forder
Jos. H. Moore

Inventor
Wm. H. Chapman
by McDaniel Wheeler & Souther
Attorneys (No Model.) 3 Sheets—Sheet 3.
W. H. CHAPMAN.
ELECTRIC MOTOR.
No. 309,522. Patented Dec. 23, 1884.
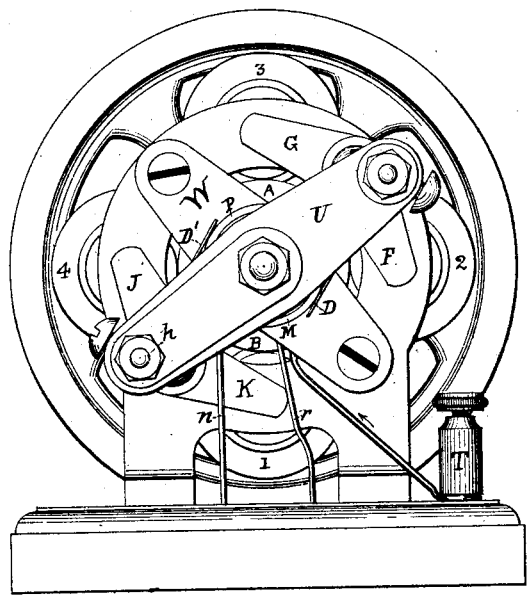
Fig. 4
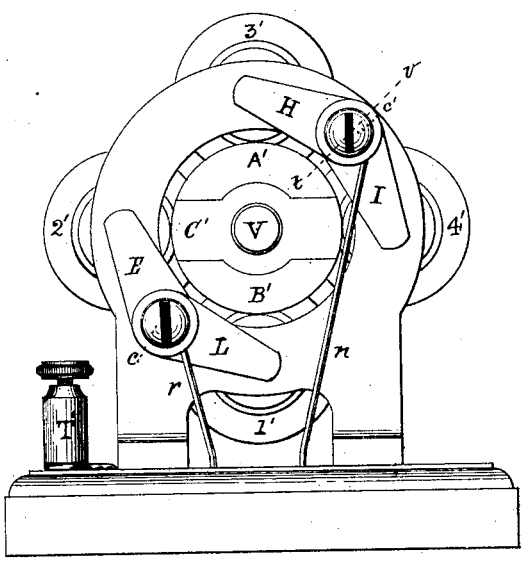
Fig. 5
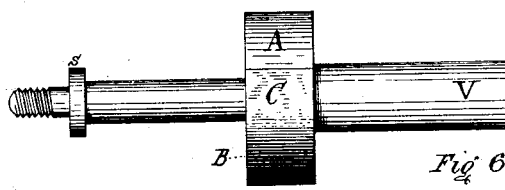
Fig. 6
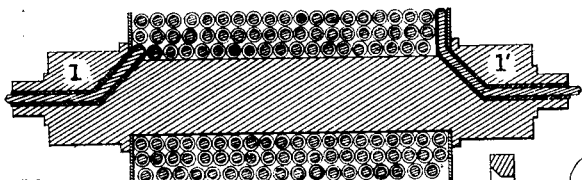
Fig. 7
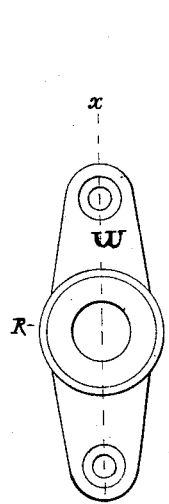
Fig. 8
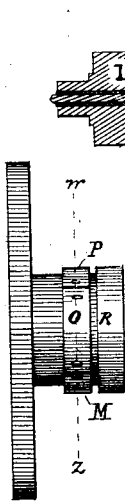
Fig. 9
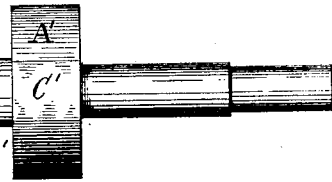
Fig. 10
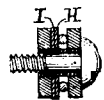
Fig. 12
Fig. 11
Witnesses.
Edw. H. Forder
Jas. M. Moore
Inventor
Wm. H. Chapman
by McDaniel Wheeler & Souther
Attorneys

UNITED STATES PATENT OFFICE.

WILLIAM H. CHAPMAN, OF MIDDLEBURY, VERMONT, ASSIGNOR TO THE CHAPMAN ELECTRIC MOTOR COMPANY, OF NEW YORK.

ELECTRIC MOTOR.

SPECIFICATION forming part of Letters Patent No. 309,522, dated December 23, 1884.

Application filed November 26, 1883. (No model.)

*To all whom it may concern:*

Be it known that I, WILLIAM H. CHAPMAN, a citizen of the United States, residing at Middlebury, in the county of Addison and State of Vermont, have invented a new and useful Electric Motor, of which the following is a specification.

My invention relates to improvements in electric motors which operate by direct rotation. The principal object of my invention is to apply to the movement of the machine all the magnetic force developed during its action by the passage of the current through the coils of the electro-magnets. I attain this object by the mechanism illustrated in the accompanying drawings, in which—

Figure 1:
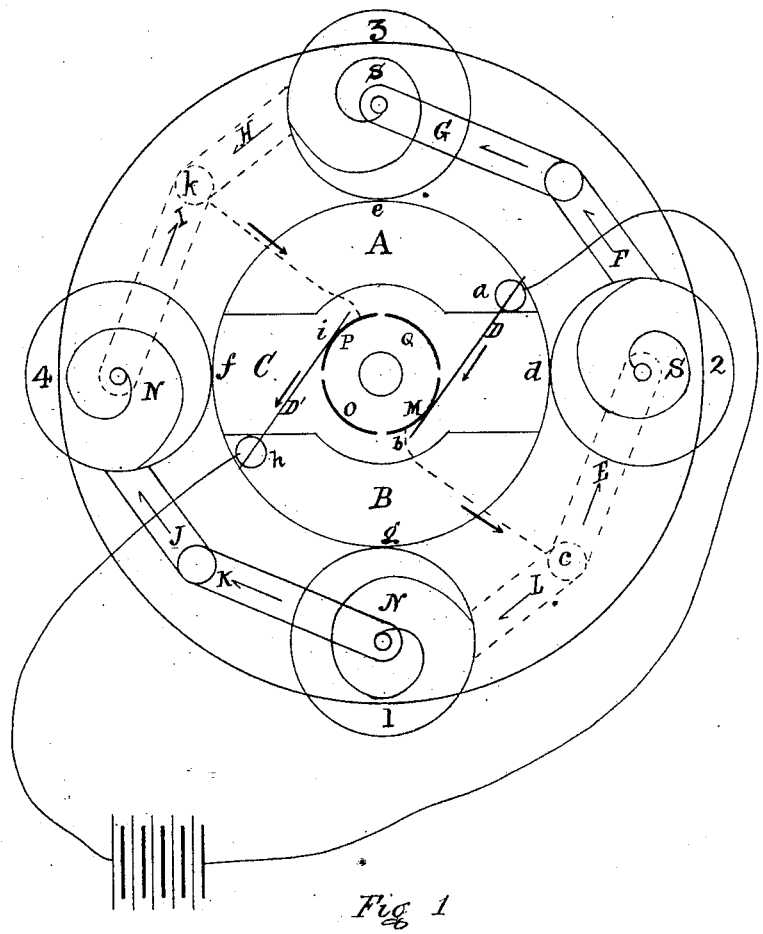
Figure 2:
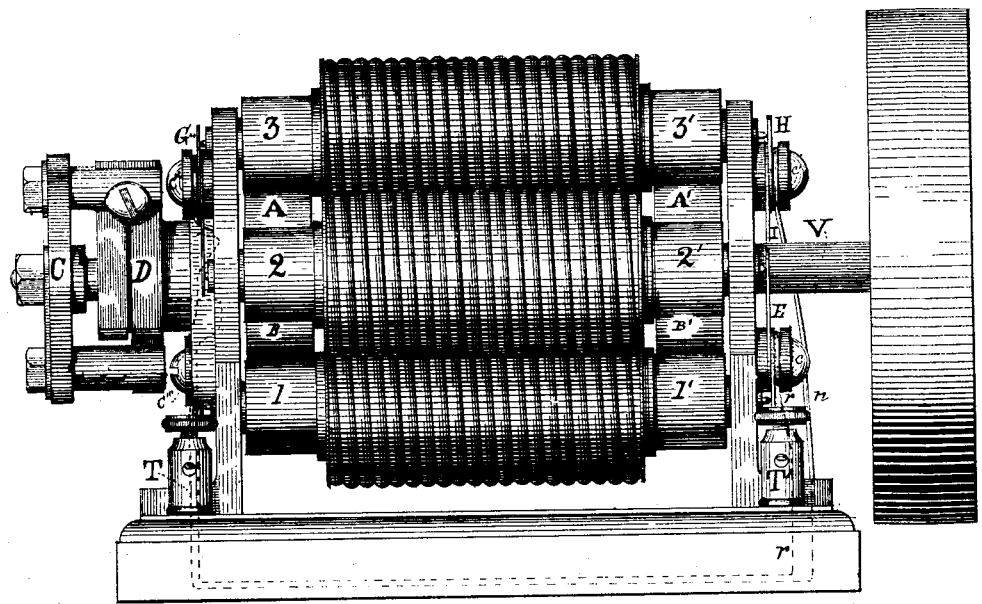
Figure 3:
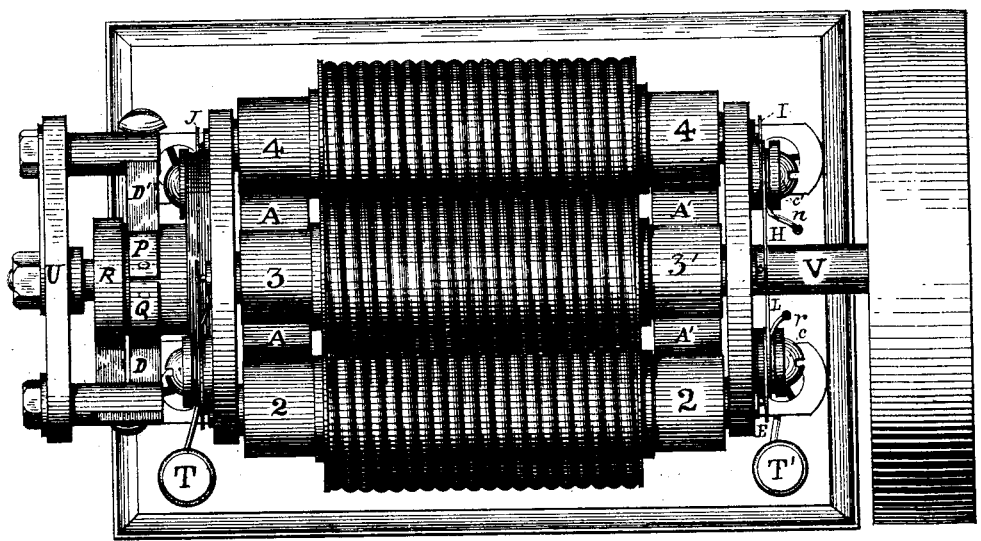

Figure 1 is a diagram of the machine, showing the course of the electric current and the connections of the different portions of the machine with the battery or other source of the current. The dotted lines in this figure represent the parts of the machine at the end farthest from the commutator. Fig. 2 is a side elevation of the machine. Fig. 3 is a plan view of the same. Fig. 4 is a view of the end at which the commutator is placed, the fly-wheel being represented on the farther end. Fig. 5 is a view of the end where the fly-wheel is placed, the fly-wheel being left off for more perfect view of the parts at that end. Fig. 6 is a longitudinal view of the shaft with the drums on it. Fig. 7 is a longitudinal cross-section of one of the rolling magnets. Fig. 8 is an end view of the commutator-drum. Fig. 9 is a side view of the same. Fig. 10 is a cross-section of Fig. 8 on line $x\,y$. Fig. 11 is a cross-section of Fig. 9 on line $w\,z$, showing also the position of the arm W. Fig. 12 represents one of the binding-screws, $c, c', c''$, and $c'''$, and a cross-section of the insulating-washers thereon, taken on the line $t\,v$, Fig. 5.

1 2 3 4 are the four electro-magnets. Each is spool-shaped with two cylindrical heads, one at each end, and mounted on journals, so as to rotate on its own axis.

A B C A' B' C' are alternate segments of brass or other non-magnetic material and of iron. C C C' C' are the segments of brass. A A' B B' are the segments of iron. They form alternate portions of a drum or drums, which are firmly attached to and rotate with the shaft of the machine. Each drum is in rolling contact with the heads of all the electro-magnets.

D and D' are the brushes through which the electric current passes to and from the commutator. D is a forked brush, one end of which rests upon the metallic ring R. Its other end rests successively upon the metallic segments M O P Q. Each of these brushes is mounted upon an end of a rotary non-conducting arm, U, in Fig. 2, attached to and rotating with the shaft V, Figs. 2, 3, and 6. This shaft passes through the commutator, but so as not to come in contact with it. The commutator therefore does not rotate, and is secured to a piece of hard rubber or other insulating material, W, Figs. 4 and 11, attached to one of the standards of the machine. The metallic pin or stud holding the brush D' is connected to the shaft of the machine by a piece of sheet-brass, clamped under the nut at the outer end of said stud and also under a nut placed on the end of the shaft, which nut serves also to hold the non-conducting rotary arm onto the shaft and against the shoulder $s$, Fig. 6, formed on the shaft.

M O P Q are segmental bands, made of brass or other electric conducting material, insulated from each other and from the shaft. R is a band of brass or other non-magnetic metal, insulated from M O P Q. These bands form a part of the commutator and are mounted as hereinbefore mentioned.

E F G H I J K L are springs forming connections between the coils of insulated wire surrounding the cores of the electro-magnets. At one end each spring is in contact with the end of the next spring, and also in contact with the wire leading to one of the segmental brass bands, and the ends of the two springs and the end of the wire are clamped together with a binding-screw, which is insulated from the springs and the wire by a hard-rubber washer or other suitable material, as shown in Fig. 12, $c, c', c''$, and $c'''$. Figs. 2, 3, 4, and 5 show these binding-screws. In Fig. 11 $m$ is a wire that connects the ring R with the binding-post T.

In Figs. 2, 3, 4, and 5 $n$ and $r$ are wires connecting the pairs H I and E L, respectively, of contact-springs with the segmental brass bands P and M, respectively, and the wires $n$ $r$ pass from one end of the machine to the other underneath the base, as represented by the dotted lines in Fig. 2.

The binding-post T' is connected by short wires (seen in Figs. 3 and 5) with the brass standard, to which it is soldered on the under side of the foot.

There are flanges on the magnet-heads, as shown in Fig. 7, for the purpose of keeping in place the drums and the shaft to which the drums are attached.

N and S indicate the alternation of polarity of the poles of the electro-magnets at each end of the machine.

The current from the battery or other source of electricity enters through the wire connected with the binding-post T. It proceeds along the wire in the manner represented in Figs. 2 and 4 to the insulated brass ring R of the commutator. It passes from there to the forked brush D, up one arm and down the other, to the brass strip M, and through that strip to the wire $b$ $c$, Figs. 1 and 10, connected with it in the manner shown in the cross-section, Fig. 10. Through that wire it passes to the contact-springs E and L, connected at the end of the machine farthest from the commutator, as shown in the dotted lines in Fig 1, and shown also in Fig. 2. At $c$, where these two contact-springs are connected, the current divides into two courses, as shown in Fig. 1 by the arrows. We will first trace that through E. This passes through E and thence through the coil of wire round the electro-magnet 2 from the center outward in a right-hand direction, thereby magnetizing the spool or core of the electro-magnet, so that the pole thereof nearest the commutator is south. When the current has passed through this coil, it passes through contact-springs F, (but part of which is shown on Fig. 1,) and contact-spring G to the coil around electro-magnet 3. It passes through that coil from the center outward in a right-hand direction, so that the pole of 3 next the commutator is south; thence to the contact-spring H, (but part of which is shown in Fig. 1;) thence through the wire $k$ $i$, Figs. 1 and 10, in the direction shown by the arrow, Fig. 1, to the brass strip P at $i$; thence through the brush D' to the arm of the commutator to which this brush is attached, and through the strip of sheet-brass clamped at its outside end at $h$ to the shaft of the machine, and thence through the shaft and the frame-work of the machine to the binding-post T', Fig. 2, which is electrically connected with the shaft, and thence back to the battery or other source of power.

We now return to trace the course of the other branch of the current which divided at $c$. It passes through the contact-spring L, (but part of which is shown on Fig. 1,) and enters the coil of electro-magnet 1 from the outside, passing inwardly in a left-hand direction, thereby making the pole of the electro-magnet at the end nearest the commutator to be north. It then passes through the contact-springs K and J (but part of which is shown in Figs. 1 and 3) to the coil of electro-magnet 4, entering it from the outside, and passing inwardly in a left-hand direction, thereby making the pole of the electro-magnet at the end nearest the commutator to be north. From this it passes through the contact-spring I to K, where it reunites with the remainder of the current. Its course from that point has been hereinbefore described.

We have thus traced the course of the current through the helices of the four electro-magnets 1 2 3 4. It now remains to describe the effect produced thereby on the mechanism of the machine.

When the machine is in the position shown in Fig. 1, the iron segment A is in contact with the head of the electro-magnet 3. The effect of this is to magnetize A and to make it in effect part of 3 and the pole-piece thereof so long as such contact continues. The extremities of this segment while in the position shown will be of the same polarity as the head of 3.

At the same time the iron segment B is in contact with the head of 1, and its extremities are of the same polarity as this head, and in effect the segment B, so long as its contact continues, is a part of the electro-magnet 1 and the pole-piece thereof. When the current enters the coil of 2, thereby magnetizing the core of the latter, with its heads, the head next the commutator attracts the segment B, thereby producing a movement of the segment B, and, consequently, of the drum of which it forms a part, toward the contact-point shown at $d$. At the same time the head of the electro-magnet 2 next the commutator repels the segment A, thereby also contributing to produce its rotary motion and that of the drum of which it forms a part, and thus combining its effect upon A with that exerted upon B, as previously described. At the same time the head of electro-magnet 4 next the commutator attracts the iron segment A and repels segment B.

The effect of the movement of the iron segments of the drums thus produced through the arc of a circle, and of the consequent partial revolution of the drum and its shaft, is, first, to break the connection between the brushes D and D' and the brass strips M and P, which they touch when in the position shown in Fig. 1, and which brushes rotate with the shaft, and to bring the brushes upon the brass strips Q and O, changing the connections of the electro-magnets, and thereby reversing the polarity of 2 and 4. The iron segments meanwhile have moved into contact with 2 and 4, and the segment A continues its polarity, which still corresponds to that pole of the magnets with which it thus has come in contact, which, by the change of connections, has become south, while B in like manner, remaining north, comes in contact with 2, which has now become north. A then is attracted by 1 and repelled by 3, while B is attracted by 3 and repelled by 1, and both continue their rotary motion until A reaches the position originally occupied by B, and B is now where A was. B is now attracted by 4 and repelled by 2. A is now repelled by 4 and attracted by 2, and thus the rotary motion of the drum and its shaft continues until the connection between the brushes D and D' and the brass strips M and P is again broken, and the connection is made between the brushes and the brass strips O and Q. The polarity of the electro-magnets 2 and 4 is thereby again reversed. Meanwhile B has come in contact with 4 and A with 2. B is now attracted by 1 and repelled by 3. A is now repelled by 1 and attracted by 3. The rotary motion continues and the circle is completed, A and B resuming the places they respectively occupied at first. Another reversal of the current in 3 and 1, and a consequent change of the poles thereof, takes place, so that the poles of the electro-magnets again are as shown in Fig. 1. The same action thereupon takes place as first described, and thus the rotary motion continues as long as the current continues to flow through the machine. While this reciprocal action and reaction has been going on in the end of the machine towards the commutator, a like action, but in the inverse order, has taken place at the other end of the machine. The head of each of the spool-shaped electro-magnets 1 2 3 4 which is farthest from the commutator will, during the action of the electric current, as described, be always of a polarity the reverse of that of the head next the commutator. When the iron segment B', therefore, is in contact with the electro-magnet head, which is marked 1' in Figs. 2, 3, and 5, and is at the end farthest from the commutator, its extremities will be of the same polarity as 1', which, under the conditions and in the position shown in Figs. 1 and 2, will be south. For similar reasons at the same time the polarity of the extremities of the iron segment A' will be of the same polarity as 3', which, under the conditions and in the position shown in Figs. 1 and 2, will be north. Whenever, therefore, A is attracted by the head of one electro-magnet, A' is attracted by the other head of the same electro-magnet, and whenever B is attracted by the head of one electro-magnet, B' is attracted by the other head of the same, and vice versa.

In the drawings but two pairs of electro-magnets and two iron segments of each drum are represented; but in the construction of electric motors for practical purposes it will be found desirable to increase the number of each. The number of electro-magnets should be always greater than that of the iron segments of each drum.

The connections and adjustment of the commutator can be so changed that no reversal of the current will take place in magnets 1 and 3, and that it shall be reversed in 2 and 4 at the moment of contact with the iron segments and at the moment this contact is broken. Such connections and adjustment can also be so arranged that the current in the coils of the electro-magnets shall be reversed at the moment the contact with the iron segments is broken, instead of at the moment it is formed; but in practice I have found the arrangement shown in the drawings and particularly described in this specification most effective.

By applying power to the axis of the machine from a steam-engine or other source of power, and adjusting the commutator so as to reverse the current in only half of the magnets, as hereinbefore mentioned, it can be used as a generator of magneto-electricity.

For the more effective operation of my machine it should be constructed so that the iron segments of the drums should be made just long enough, or a very little more than just long enough, to extend over the arc of the circle inscribed within and tangential to the heads of the electro-magnets. The electro-magnets should be placed closely to one another, but so as not to be directly in contact with one another. The space between the iron segments of the drums need only be large enough to insulate them magnetically from one another.

The commutator and its connections should be so adjusted that the current shall be reversed substantially at the moment the electro-magnet head comes in contact with the iron segment of the drum, or at the moment this contact is broken, or both. In the adjustment of the connections (shown in the drawings) the current is reversed at the moment the contact is formed.

I am aware that electric motors and generators of magneto-electricity have been made with a continuous rotary motion in which the forces of attraction and repulsion are simultaneously employed. I do not therefore claim as new this feature of my machine.

What I claim as new, and desire to secure by Letters Patent of the United States, is as follows:

1. Two cylindrical magnets arranged to revolve on their own axes and to roll on the surface of a drum, composed of alternate sections of magnetic and non-magnetic material, the segments of magnetic material being of suitable length to cover the arc included between said magnets, and thus to connect them at one point during each rotation.

2. One or more pairs of spool-shaped electro-magnets, arranged to rotate on their own axes, and adapted to roll on the curvilinear surface of one or more pieces of iron, which they tend to move in one direction by their simultaneous and respective attraction and repulsion.

3. One or more pairs of magnets with cylindrical heads, placed at fixed distances from each other, and arranged to rotate on their own axes, and one or more pieces of soft iron arranged to come in tangential contact with the cylindrical surfaces of said magnets and unite the head of one magnet with the head of the other magnet, thus forming a complete circuit.

4. In an electric motor or generator, two magnets placed at a fixed distance from each other, and a strip or piece of iron arranged to move in contact or close proximity with one of such magnets and act as its pole-piece while it is passing in close proximity to the other magnet or withdrawing therefrom.

5. The combination of a system composed of two or more magnets and a system composed of two or more armatures, the two systems being arranged to move relatively to each other, so that each of the magnets in turn shall have a pair of armatures for pole-pieces through which it exerts an attractive or repulsive effect on another of the magnets, said pole-pieces being themselves attracted or repelled thereby.

6. The combination of one or more pairs of cylindrical-headed magnets with one or more drums composed of two or more iron segments separated by non-magnetic material, so arranged as to roll upon the surfaces of each other or come in close proximity thereto, and so that each magnet shall alternately attract and repel a magnetic section of the drum in such manner as to produce a continuous rotary motion.

7. The combination of two or more cylindrical-headed magnets with one or more drums composed of alternate sections of magnetic and non-magnetic material, so arranged as to extend the poles of each magnet whenever it is in contact with a magnetic portion of the drum, and thus increase its effective work by means of the repulsion between itself and the adjoining magnet of like polarity, whereby the center of magnetic action is brought nearer to the section of magnetic material which is approaching it, but with which it is not yet in contact.

8. The combination of, first, three or more electro-magnets; second, one or more armatures mounted on a shaft rotating in the center of the magnets, one armature being always in rolling contact with the head of one of the electro-magnets, and thus forming the pole-piece thereof, and at the same time being within the field of force of the two adjacent magnets on either side, so as to be attracted by one and repelled by the other, and, third, of a commutator so adjusted as to reverse the current in the coils of each of the electro-magnets at or nearly at the moment of making or breaking contact with the armature.

9. The combination of, first, three or more electro-magnets; second, one or more armatures mounted on a shaft rotating in the center of the magnets, one armature being always in rolling contact with the head of one of the electro-magnets, and thus forming the pole-piece thereof, and at the same time being within the field of force of one of the two adjacent magnets on either side of it, so as to be attracted or repelled by said adjacent magnet, and, third, of a commutator so adjusted as to reverse the current in the coils of the electro-magnets at or nearly at the moment of making or breaking contact with the armature.

10. An electro-magnetic machine in which pairs of electro-magnets arranged in a circle alternate with pairs of opposite polarity, the adjacent heads of the members of each pair being similar to each other and opposite to those of the adjacent pair, and in which the magnets attract armatures moving in a circle magnetized by opposing magnet-heads until actual contact is established.

11. An electric motor or electro-magnetic machine in which pairs of electro-magnets arranged in a circle alternate with pairs of opposite polarity, the adjacent heads of the members of each pair being similar to each other and opposite to those of the adjacent pair, and in which the magnets attract armatures moving in a circle and magnetized by opposing magnet-heads until actual contact is established, the current being reversed at or near either the moment of such contact or at or near the moment of breaking contact between the armature and its magnetizing-head, or both.

12. In an electro-magnetic machine, the combination of a system of two or more electro-magnets with a system of armatures, the members of one system arranged to rotate continuously in contact with members of the other system, and be so moved relatively thereto that each armature is constantly being both attracted and repelled, and the forces of attraction and repulsion operating so as to co-operate and produce a continuous rotary motion of the armatures.

13. The combination of pairs of magnets of opposing poles with armatures rotating continuously upon them, and so arranged that the opposing poles operate with combined force to produce rotation of the armature system.

14. The combination, first, of a circle of electro-magnets divided into two parts by a diameter, all the magnets on one side of the diameter being of one polarity, and all the magnets on the other side of the diameter being of the opposite polarity; second, of one or more pairs of soft-iron armatures, coming successively in contact with the magnet-heads, and during such contact magnetized thereby, and, third, of a commutator so adjusted as to reverse the current in the poles of each magnet at or nearly at the moment of making or breaking contact with the armature.

Signed by me this 24th day of November, A. D. 1883.

WM. H. CHAPMAN.

Witnesses:
HENRY C. FREEMAN,
HAROLD G. CORTIS.